Aug. 23, 1927.  
C. SUZUKI  
1,639,909  
CEREAL SWELLING MACHINE  
Filed March 26, 1924   2 Sheets-Sheet 1
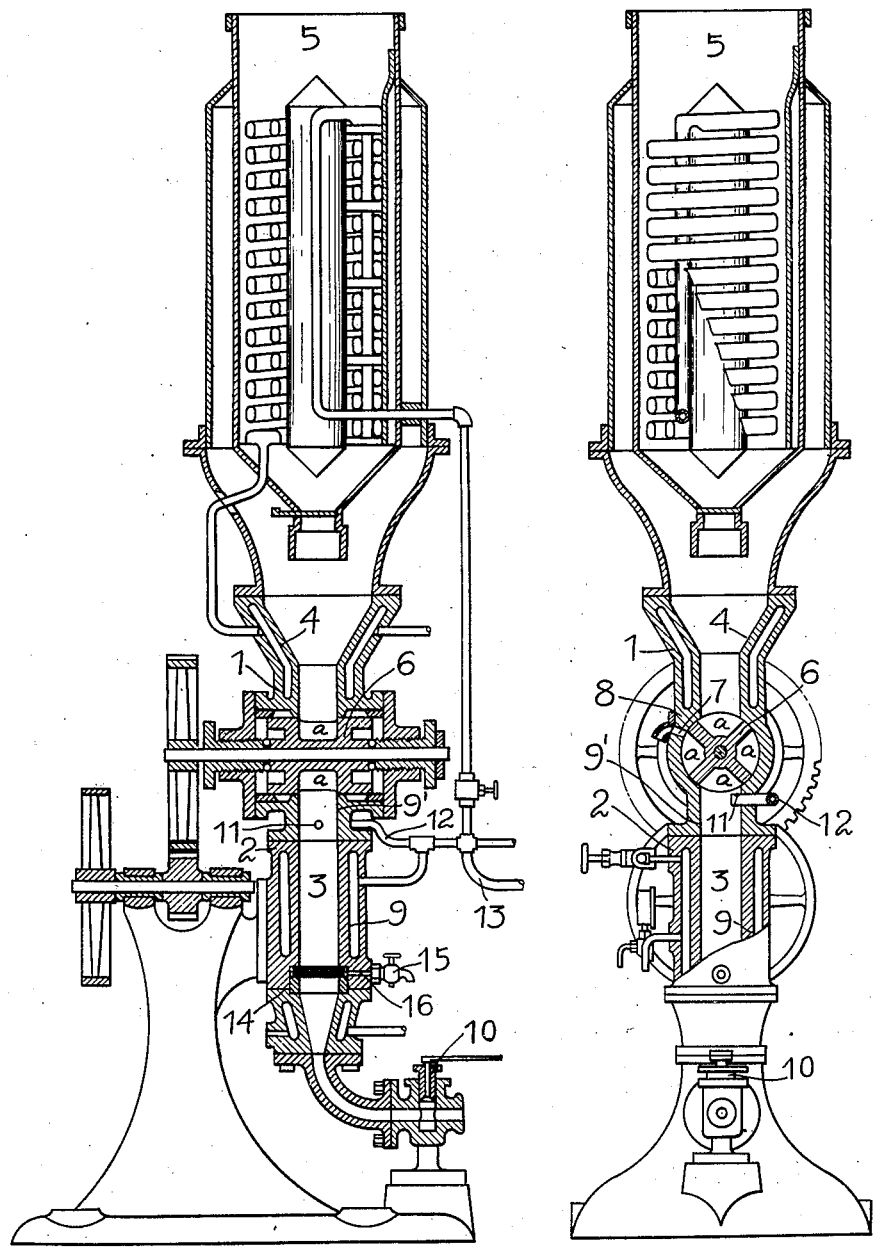

Aug. 23, 1927. 1,639,909
C. SUZUKI
CEREAL SWELLING MACHINE
Filed March 26, 1924 2 Sheets-Sheet 2
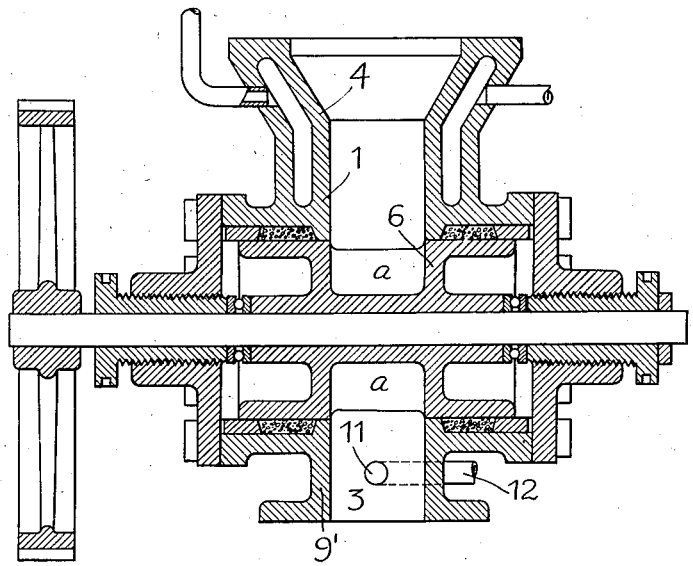
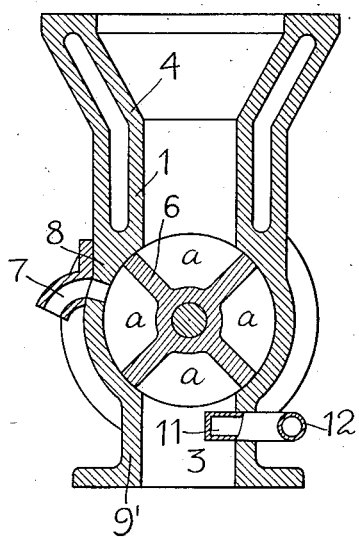
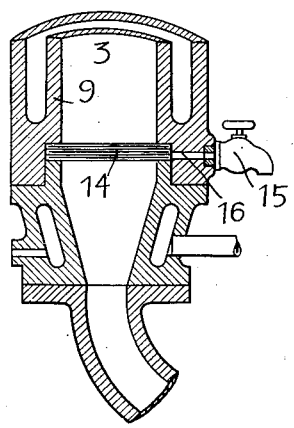
Inventor
C. Suzuki Patented Aug. 23, 1927.

1,639,909

UNITED STATES PATENT OFFICE.

CHUJIRO SUZUKI, OF TOKYO, JAPAN.

CEREAL-SWELLING MACHINE.

Application filed March 26, 1924. Serial No. 702,157.

The present invention relates to improvements in machines for puffing cereals such as wheat, rice etc. after the cereals have been shelled or hulled.

It is the primary aim and object of this invention to provide a cereal puffing machine which embodies generally a preheating means for the shelled cereal, feeding means associated with the preheating means and including valve means for passing the cereal into a steaming chamber situated beneath the feeding means and in connection therewith and means for regulating the discharge of the treated or puffed cereal from the steaming means.

As an additional object the invention includes the provision of a cereal puffing machine wherein means is provided for drawing off products of condensation that may accumulate within the steaming chamber.

Among the other aims and objects may be recited the provision of a machine of the above character constructed with a view to compactness wherein the number of parts are few, the construction simple, the cost of production low and the efficiency high.

In order that the invention may be thoroughly understood a more detailed description will now be given and reference will be made to the accompanying drawings, in which:

Fig. 1 is a sectional elevation of one embodiment according to the invention,

Fig. 2 is a sectional side view of the above,

Fig. 3 is a detailed view of Fig. 1, showing the cereals feeding device particularly, Fig. 4 is a sectional side view of Fig. 3 and Fig. 5 is a detailed view of Fig. 1, showing the steam drawing device particularly.

Referring to the drawings, a casing 1, which constitutes the casing of the cereals-feeding device, is mounted upon a vertical cylinder 2 constituting the high-pressure steam chamber 3. The casing 1 is funnel shaped, its diverging upper part 4 being adapted to receive cereals dropping from a preheating chamber 5 which is situated thereabove.

The lower part of the casing 1 is enlarged to provide a transversely disposed cylindrical chamber in which is positioned a rotary valve 6 of cruciform section, the valve being fitted in an airtight manner within the cylindrical chamber so as to prevent the escape of steam during its rotation. Each of four chambers or compartments $a$, which are formed around the said valve, is adapted to be successively positioned opposite to the steam chamber 3 and rotates to feed the cereals into the said steam chamber, while a port 7, which is provided in the shoulder 8 of the casing 1, serves to release the steam contained within the chambers $a$.

To the lower part 9 of the cylinder 2 is attached a discharge valve 10, by means of which the discharge of the treated cereals can be controlled according to the rotation of the cereals-feeding valve 6.

The high-pressure steam, which acts upon the cereals in the steam chamber 3, is injected into the upper part of the steam chamber through a hole 11 in a pipe 12 positioned in the upper part 9' of the cylinder 2, passing through a steam pipe 13, and mixed with the cereals, steaming and swelling them into favorable condition; thus the steam is finally discharged through the valve 10 with the treated cereals.

The interchanging of the steam can be effectively done by the steam-drawing device, provided in the lower part of the machine, which consists of a band of annular thin plates 14 superposed with respect to one another (Fig. 5) and a drain valve 15, the latter being adapted to communicate with the former. A part of the steam is removed by the said drain valve through the annular thin plates which are used here in order to prevent the cereals from closing an orifice 16 between the steam chamber and drain valve.

The operation of the present machine is as follows:

When the valve 6 is revolved and the high-pressure steam is introduced into the steam chamber 3, the cereals previously heated in the preheating chamber 5 drop into the casing 1 and then are fed into the said steam chamber 3, meanwhile the port 7 in the shoulder of the casing releases the steam contained in the chambers $a$, to facilitate the dropping of the cereals. Thus the cereals are treated so as to be puffed in the chamber 3 and are finally discharged through the valve 10.

It is of course to be understood that the machine described above may be modified in various manners without departing from the scope of this invention.

I claim—

1. A machine of the character described comprising preheating means, feeding means arranged therebeneath including a cylinder casing, a hopper above the casing and connected with the preheating means for guiding the material to the casing, a rotary valve arranged transversely within the casing, a high pressure steam chamber connected to the bottom of the casing, means for conducting steam into the upper part of the steam chamber and exhausting it from the lower part thereof, a steam drawing device positioned at the bottom of the steam chamber including a plurality of superposed annular and relatively thin plates, and a drain valve in communication with the space between the plates and valve means connected with the means for exhausting the steam from the chamber for regulating the treated material from the chamber.

2. In a machine of the character described, a steam chamber, a casing above the chamber provided with a hopper, a rotary valve of cruciform section mounted transversely of the casing, means for admitting steam into the top of the chamber and into the casing for exhausting steam into the lower end of the chamber, means for exhausting steam from the valve casing, and valve control means for regulating the delivery of treated grain from the chamber.

In testimony whereof I affix my signature.

CHUJIRO SUZUKI.